United States Patent
Conn et al.

(10) Patent No.: US 10,614,378 B2
(45) Date of Patent: Apr. 7, 2020

(54) CROSS-WELL ALLOCATION OPTIMIZATION IN STEAM ASSISTED GRAVITY DRAINAGE WELLS

(71) Applicant: International Business Machines Corporation, Armonk, NY (US)

(72) Inventors: Andrew R. Conn, Mount Vernon, NY (US); Lior Horesh, North Salem, NY (US); Matthias Kormaksson, Rio de Janeiro (BR); Moshood Omolade Saliu, Calgary (CA); Theodore G. van Kessel, Millbrook, NY (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 15/276,020

(22) Filed: Sep. 26, 2016

(65) Prior Publication Data
US 2018/0089145 A1    Mar. 29, 2018

(51) Int. Cl.
*G06N 20/00*    (2019.01)
*E21B 43/24*    (2006.01)

(52) U.S. Cl.
CPC ......... *G06N 20/00* (2019.01); *E21B 43/2408* (2013.01)

(58) Field of Classification Search
CPC ...... E21B 43/00; E21B 47/00; E21B 43/2406; G06F 3/00; G06F 17/5009
See application file for complete search history.

(56) References Cited

U.S. PATENT DOCUMENTS

| | | |
|---|---|---|
| 6,257,334 B1 | 7/2001 | Cyr et al. |
| 7,879,768 B2 | 2/2011 | Wu |
| 8,146,669 B2 | 4/2012 | Mason |
| 8,756,019 B2 | 6/2014 | Pimenov et al. |
| 8,849,639 B2 | 9/2014 | Brown et al. |

(Continued)

FOREIGN PATENT DOCUMENTS

| | | |
|---|---|---|
| CN | 203905930 | 10/2014 |
| WO | WO 2016025245 | 2/2016 |

OTHER PUBLICATIONS

Andrew R. Conn, Multi-Level Modeling of Steam Assisted Gravity Drainage Wells, unpublished U.S. Appl. No. 15/275,951, filed Sep. 26, 2016, pp. 1-24 plus9 sheets drawings.

(Continued)

*Primary Examiner* — Kandasamy Thangavelu
(74) *Attorney, Agent, or Firm* — Joseph Petrokaitis; Otterstedt, Wallace & Kammer, LLP

(57) ABSTRACT

One aspect includes a method for use with a plurality of steam assisted gravity drainage wells. The method includes designing a first modeling framework which provides a model of total output for the plurality of wells from one or more input variables for respective ones of the plurality of wells. The method also includes designing a second modeling framework which provides a model of output for a given one of the plurality of wells based at least in part on one or more input variables for the given one of the plurality of wells and one or more input variables for at least another one of the plurality of wells. The method further includes utilizing the first and second modeling frameworks to determine an optimal configuration for the wells and configuring the well to operate with the determined optimal configuration.

20 Claims, 8 Drawing Sheets

(56) References Cited

U.S. PATENT DOCUMENTS

| | | | |
|---|---|---|---|
| 8,977,502 | B2 | 3/2015 | Liu |
| 9,043,189 | B2 | 5/2015 | Wallace et al. |
| 9,085,958 | B2 | 7/2015 | Laing et al. |
| 9,163,497 | B2 | 10/2015 | Laing et al. |
| 9,587,480 | B2 | 3/2017 | Guerrero et al. |
| 9,739,125 | B2 | 8/2017 | Benson et al. |
| 9,803,469 | B2 | 10/2017 | Kaiser et al. |
| 9,845,669 | B2 | 12/2017 | Miller et al. |
| 9,964,654 | B2 | 5/2018 | Laake |
| 10,088,596 | B2 | 10/2018 | Maerten |
| 2002/0082815 | A1 | 6/2002 | Rey-Fabret et al. |
| 2006/0095872 | A1 | 5/2006 | McElvain et al. |
| 2007/0055392 | A1 | 3/2007 | D'Amato et al. |
| 2009/0166033 | A1* | 7/2009 | Brouwer .......... E21B 43/00 166/250.02 |
| 2011/0060572 | A1 | 3/2011 | Brown et al. |
| 2011/0288778 | A1 | 11/2011 | Pavlovich et al. |
| 2011/0320047 | A1* | 12/2011 | Stone ............ E21B 43/00 700/282 |
| 2012/0024524 | A1 | 2/2012 | Marsimovich et al. |
| 2012/0059640 | A1 | 3/2012 | Roy et al. |
| 2013/0105147 | A1 | 5/2013 | Scott |
| 2013/0175030 | A1 | 7/2013 | Ige et al. |
| 2013/0262061 | A1 | 10/2013 | Laake |
| 2013/0277049 | A1 | 10/2013 | Liu |
| 2014/0124194 | A1 | 5/2014 | Jorshari |
| 2014/0216732 | A1 | 8/2014 | Stone et al. |
| 2014/0216739 | A1 | 8/2014 | Brown et al. |
| 2014/0278302 | A1 | 9/2014 | Ziegel et al. |
| 2014/0352966 | A1 | 12/2014 | Yuan |
| 2015/0009499 | A1 | 4/2015 | VanderHeyden et al. |
| 2015/0114633 | A1* | 4/2015 | Godfrey ............ E21B 47/00 166/252.1 |
| 2015/0161304 | A1 | 6/2015 | Vachon |
| 2015/0198022 | A1 | 7/2015 | Stanecki et al. |
| 2015/0354336 | A1* | 12/2015 | Maurice .......... E21B 43/2406 706/12 |
| 2016/0032692 | A1 | 2/2016 | Conn et al. |
| 2016/0054713 | A1 | 2/2016 | Foss et al. |
| 2016/0098502 | A1* | 4/2016 | Havre .............. G06F 17/5009 703/9 |
| 2016/0201453 | A1 | 7/2016 | Kaiser et al. |
| 2016/0245065 | A1 | 8/2016 | Gray et al. |
| 2016/0245071 | A1 | 8/2016 | Vincelette et al. |
| 2016/0251957 | A1 | 9/2016 | Mcewen-King et al. |
| 2016/0281497 | A1 | 9/2016 | Tilke et al. |
| 2016/0312592 | A1 | 10/2016 | Chen et al. |
| 2016/0312599 | A1 | 10/2016 | Adam et al. |
| 2017/0045055 | A1 | 2/2017 | Hoefel et al. |
| 2017/0051597 | A1 | 2/2017 | Akiya et al. |
| 2017/0177992 | A1 | 6/2017 | Klie |
| 2017/0336811 | A1 | 11/2017 | Stone et al. |
| 2017/0350217 | A1* | 12/2017 | Paul ..................... G06F 3/00 |
| 2017/0351227 | A1* | 12/2017 | Paul ..................... E21B 43/00 |
| 2018/0087371 | A1 | 3/2018 | Vincelette et al. |
| 2018/0195374 | A1 | 7/2018 | Stalder |

OTHER PUBLICATIONS

Andrew R. Conn, Controlling Operation of a Steam-Assisted Gravity Drainage Oil Well System Utilizing Continuous and Discrete Control Parameters, unpublished U.S. Appl. No. 15/276,152, filed Sep. 26, 2016, pp. 1-44 plus 10 sheets drawings.

Andrew R. Conn, Controlling Operation of a Steam-Assisted Gravity Drainage Oil Well System by Adjusting Controls to Reduce Model Uncertainty, unpublished U.S. Appl. No. 15/276,168, filed Sep. 26, 2016, pp. 1-35 plus 6 sheets drawings.

Andrew R. Conn, Controlling Operation of a Steam-Assisted Gravity Drainage Oil Well System by Adjusting Multiple Time Step Controls, unpublished U.S. Appl. No. 15/276,178, filed Sep. 26, 2016, pp. 1-36 plus 8 sheets drawings.

Andrew R. Conn, Controlling Operation of a Steam-Assisted Gravity Drainage Oil Well System by Adjusting Controls Based on Forecast Emulsion Production, unpublished U.S. Appl. No. 15/276,189, filed Sep. 26, 2016, pp. 1-37 plus 12 sheets drawings.

List of IBM Patents or Patent Applications Treated As Related.

N. Alau et al., "Neural Network Meta-Modeling of Steam Assisted Gravity Drainage Oil Recovery Processes," Iranian Journal of Chemistry & Chemical Engineering, vol. 29, No. 3, Sep. 2010, pp. 109-122.

C. Blundell et al., "Weight Uncertainty in Neural Networks," 2015, 10 pages.

N.V. Queipo et al., "Surrogate Modeling-Based Optimization of SAGO Processes," Journal of Petroleum Science and Engineering, Jul. 2002, pp. 83-93, vol. 35, Nos. 1-2.

ip.com, "Methods for SAGO Optimization," IP.com No. IPCOM000213572D, Dec. 21, 2011, 10 pages.

H.X. Nguyen et al., "Experimental Design to Optimize Operating Conditions for SAGO Process," Society of Petroleum Engineers (SPE), SPE Asia Pacific Oil & Gas Conference and Exhibition, SPE 145917, Sep. 2011, 11 pages, Jakarta, Indonesia.

Dennis Denney, "Real-Time Optimization of SAGO Operations," Society of Petroleum Engineers, Journal of Petroleum Technology (JPT), Jun. 2013, pp. 126-128, vol. 65, No. 6.

Shin et al., "Review of Reservoir Parameters to Produce SAGO and Fast-SAGO Operating Conditions," Journal of Canadian Petroleum Technology (JCPT), Jan. 2007, pp. 35-41, vol. 46, No. 1.

English translation for China Application No. CN203905930U.

Wikipedia, "Linear Regression", down loaded Mar. 2019, pp. 1-3, U.S. Appl. No. 15/275,951.

Di Serio et al., "Investigating Determinants of Multiple Sclerosis in Longitunal Studies: A Bayesian Approach" , Journal of Probability and Statistics, 2009 pp. 1-24 Plus Back Cover.

Hastie et al., "Generalized additive modles for medical research", Statistical methods in medical research, 1995. pp. 187-196.

Marx et al., "Direct generalized additive modeling with penalized likelihood", Computational Statistics & Data Analysis, 1998. pp. 193-209.

Ullah et al., "Applications of functional data analysis: A systematic review", BMC Medical Research Methodology, 2013. pp. 1-12.

* cited by examiner

100

300

500

600

700

800

CROSS-WELL ALLOCATION OPTIMIZATION IN STEAM ASSISTED GRAVITY DRAINAGE WELLS

CROSS REFERENCE TO RELATED APPLICATIONS

The present application is related to concurrently-filed and commonly-owned U.S. Patent Application 15/275,951, which has identical inventorship to the present application, the entire disclosure of which is expressly incorporated by reference herein for all purposes.

BACKGROUND

The present invention relates to the electrical, electronic and computer arts, and, more particularly, to modeling of steam assisted gravity drainage wells.

Steam assist gravity drainage (SAGD) refers to a method of extracting bitumen from oil sands. A SAGD well includes two parallel horizontal pipes, one above (e.g., less deep than) the other. Steam is injected into the upper pipe, called the injection pipe, to heat the surrounding earth. Heating reduces the viscosity of the bitumen contained in the oil sands allowing it to flow under gravity. This flow of bitumen and water condensate is collected and extracted by pumping using the lower pipe, called the producer pipe.

Costs in a SAGD operation are dominated by the cost of heating the steam relative to the amount of bitumen extracted. Thus, there is a long-felt but unmet need to model the behavior of the SAGD well with the aim of optimizing the production of bitumen with the least amount of steam. The inventors are unaware of any data-driven method for modeling multiple SAGD wells which account for cross-correlations between wells.

SUMMARY

An embodiment of the present invention includes a method for use with a plurality of steam assisted gravity drainage wells. The method comprises designing a first modeling framework which provides a model of total output for the plurality of wells from one or more input variables for respective ones of the plurality of wells. The method also comprises designing a second modeling framework which provides a model of output for a given one of the plurality of wells based at least in part on one or more input variables for the given one of the plurality of wells and one or more input variables for at least another one of the plurality of wells. The method further comprises utilizing the first and second modeling frameworks to determine an optimal configuration for the wells and configuring the well to operate with the determined optimal configuration.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

These and other features and advantages of the present invention will become apparent from the following detailed description of illustrative embodiments thereof, which is to be read in connection with the accompanying drawings.

DETAILED DESCRIPTION

Figure 1:
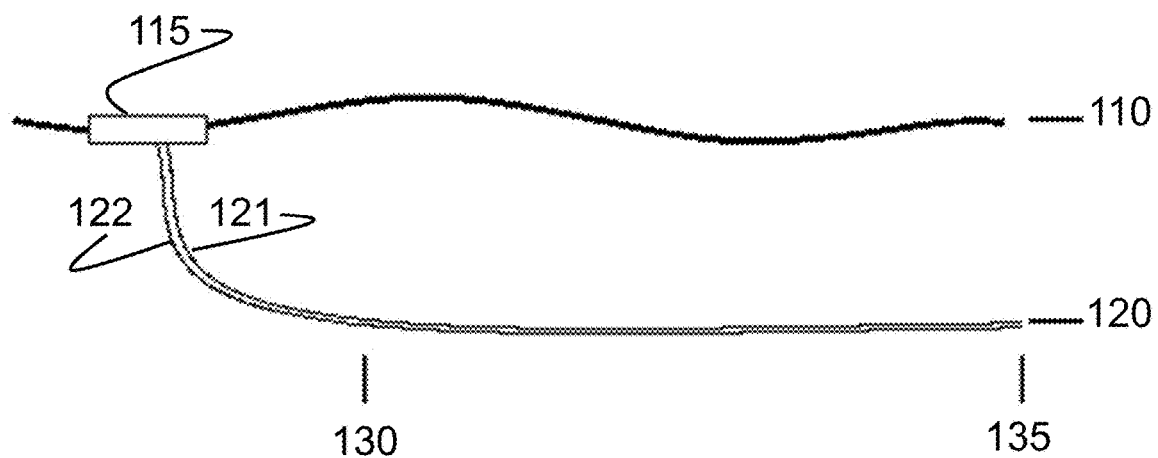
FIG. 1 shows an exemplary steam assist gravity drainage (SAGD) well suitable for use with an illustrative embodiment of the present invention.

FIG. 1 shows an exemplary steam assist gravity drainage (SAGD) well 100 suitable for use with an illustrative embodiment of the present invention. The SAGD well 100 includes a pair of well pipes (injector pipe 121, for steam injection, and producer pipe 122, for emulsion return) located at a level 120 within an oil sands layer below surface 110. Level 120 is typically about 150-1200 meters below surface 110, e.g., 300-900 meters below surface 110, though it may be shallower or deeper.

Pipes 121 and 122 are substantially horizontal, and substantially parallel to each other, at least in the region between heel 130 and toe 135. The region between heel 130 and toe 135 is referred to as the steam injection zone or steam chamber, and the portions of the pipes within this zone are referred to as the "lead in," which may be about 500-1000 meters in length, or which may be shorter or longer. Pipes 121 and 122 are connected to well pad 115 at surface 110, and the total length of each pipe between well pad 115 and heel 130 may be about 500-1000 meters in length, or may be shorter or longer.

Pipes 121 and 122 may be separated by a distance of about 2-5 meters, although this separation may be higher or lower. At least within the steam injection zone, injector pipe 121 is located above producer pipe 122. Pipes 121 and 122 are slotted and valved to facilitate optimal extraction. There are temperature sensors along the respective well bores for both pipes 121 and 122.

Steam is injected into the well through the injector pipe 121 at heel 130 and toe 135 to heat the surrounding earth in the steam injection zone proximate to the well. Heating reduces the viscosity of the bitumen contained in the oil sands allowing it to flow under gravity. As the well heats, a steam pocket is formed and the bitumen contained in the porous rock loses much of its viscosity and is able to flow under gravity along with steam condensate and ground water as emulsion. This flow of emulsion, including bitumen and water condensate, is collected using producer pipe 122. Thus, circulation of the steam injected by pipe 121 makes oil move towards well producer pipe 122. Emulsion is extracted and returned by pumping from the producer pipe 122 to bring it to the well pad 115 at the surface 110 for distribution.

As previously noted, costs in a SAGD operation are dominated by the cost of heating the steam relative to the amount of bitumen extracted. Thus, there is a long-felt but unmet need to model the behavior of the SAGD well with the aim of optimizing the production of bitumen with the least amount of steam. The inventors are unaware of any systematic data-driven predictive modeling for these kinds of data.

Illustrative embodiments of the present invention seek to build data-driven predictive models for the production flow (e.g. oil or emulsion flow) relative to input variables such as the amount of steam injected. Rather than only allowing the production flow of a single well to depend on its own input variables, illustrative embodiments of the present invention also model the possibility of the input of one well affecting the flow of one or more other wells.

Thus, an illustrative embodiment of the invention may include a method of generating data driven predictive models of multiple SAGD oil wells performance by applying predictive models in two modeling frameworks. The first modeling framework models total emulsion summing over all wells (e.g. across a single pad) with respect to the input variables of each of the wells in question. The second modeling framework models each well's emulsion with respect to its own input variables as well as with respect to the input variables of the other wells. The modeling produces machine executable functions to reproduce and predict desired output variables from a set of inputs.

Additionally or alternatively, an illustrative embodiment of the invention may include a method of modeling simultaneously multiple SAGD oil wells through predictive models. More particularly, an illustrative embodiment may model the emulsion in two distinct ways. The first model involves the modeling of total emulsion (of all wells) with respect to a set of input variables from all wells. The second model allows for simultaneous modeling of each individual well's emulsion with respect to a set of input variables from that well and also other wells. The latter analysis sheds light on potential cross-correlations that may assist with managing each individual well, while also accounting for other well's behaviors. The former analysis provides a global model of total emulsion that may be used for optimization of total flow across all wells.

Additionally or alternatively, an illustrative embodiment of the invention may include a method of modeling multiple SAGD oil wells comprising selection and/or computation of input variable sets across all wells, and applying machine learning algorithms to said input variable sets to train against chosen output variables from all wells in order to generate one or more executable functions capable of reproducing said output variables from said input variable sets. The one or more executable functions may be symbolically differentiable. In one embodiment, a user may choose from a set of potential inputs which are the input variables to be used for modeling. The chosen input variables are measured and collected in real time by sensors and stored in historical data bases. The input variable sets may include control variables (e.g. at least one of heel steam flow, toe steam flow, gas casing pressure, emulsion pressure), observables (e.g. bottom hole pressure, blanket gas pressure, producer temperature profile, sub-cool profile, heel surface pressure, and toe surface pressure), and/or static variables (e.g. well position and/or depth). The output variables may include at least one of emulsion flow and/or oil flow.

Figure 2:
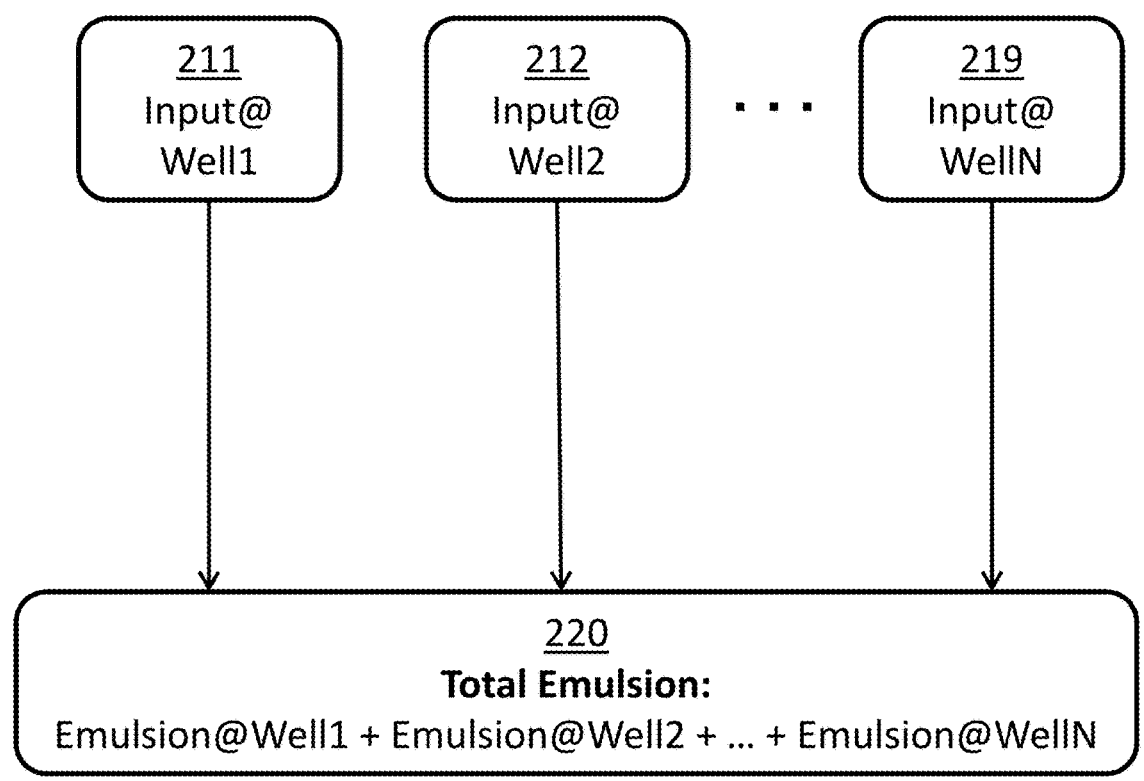
FIG. 2 shows an exemplary first modeling framework according to an illustrative embodiment of the present invention.

FIG. 2 shows an exemplary first modeling framework 200 according to an illustrative embodiment of the present invention. The exemplary first modeling framework 200 models the output variable "daily total emulsion of all wells" (e.g., 220) from a joint set of input variables (e.g., 211, 212 and/or 219). Thus, modeling framework 200 provides a model of total emulsion (e.g., 220) summing over all wells (e.g. across a single pad) with respect to the input variables at each of the wells in question (e.g., 211, 212 and/or 219). Input variables 211, 212 and/or 219 may include control variables, e.g., steam injection (e.g., toe steam flow and/or heel steam flow), gas casing pressure, and/or emulsion pressure, observables (e.g. bottom hole pressure, blanket gas pressure, producer temperature profile, sub-cool profile, heel surface pressure, and toe surface pressure), and/or static variables (e.g. well position and/or depth). The total emulsion may be modeled as a function of these inputs using data-driven models such as neural networks, random forests, functional linear models, additive models, linear regression, and/or non-linear regression. In general, the total emulsion may be modeled as a function $f$ of the input variables (e.g. control variables and/or observables and/or static variables). The function maps the input onto the output variables, i.e.

$$\text{Output} = f(\text{input}_1, \ldots, \text{input}_K),$$

Where Output denotes a vector of one or more output variables (e.g. oil flow and/or emulsion rate) and $\text{input}_1, \ldots, \text{input}_K$ denotes at least one or more (up to K) different input variables among control variables (e.g. toe steam flow, heel steam flow, gas casing pressure, and emulsion pressure) and/or observables (e.g. downhole temperature, temperatures along producer and/or injector pipes, steam injection surface pressure, and/or blanket gas pressure) and/or static variables (e.g. well position and/or depth). The function $f$ may be a physics-inspired deterministic function provided by a domain expert that exploits known relationships between physical variables in the literature. The function $f$ may also be a learned function from a Machine Learning algorithm e.g. Neural Network, Deep Learning, Random Forests, Functional Linear Model, Regression.

As an example, the daily total emulsion may be modeled using functional linear model using as input the average daily temperature variables $\{\text{Temp}(w), w=\text{wellpos} \in [0, X]\}(m)\}$ observed across all wells, where wellpos=0 corresponds to the heel of the well and X denotes the toe of the well (i.e. X denotes the full well distance from heel to toe).

This is an extension of the model considered in the aforementioned concurrently-filed patent application 15/275,951, where daily emulsion of a single well was modeled as a function of the temperature of the corresponding well. In the current patent the daily total emulsion (summed over multiple wells 1, . . . , n) is modeled using functional linear model involving all daily temperature profiles of corresponding wells:

$$\text{TotalEmulsion} = \beta_0 + \int \text{Temp}_1(s)\beta_1(s)ds + \ldots + \int \text{Temp}_n(s)\beta_n(s)ds + \varepsilon$$

where "TotalEmulsion=Emulsion at well 1+Emulsion at well 2+ . . . +Emulsion at well n" denotes the total daily emulsion across all wells, $\beta_0$ is an overall intercept and denotes the error associated with predicting daily TotalEmulsion. The functions $\beta_i(s)$, i=1, . . . , n, are mathematically interpreted as the instantaneous per unit increase effect of downhole temperature $\text{Temp}_i(s)$ at well position s (in well i), on expected daily TotalEmulsion across all wells.

Figure 3:
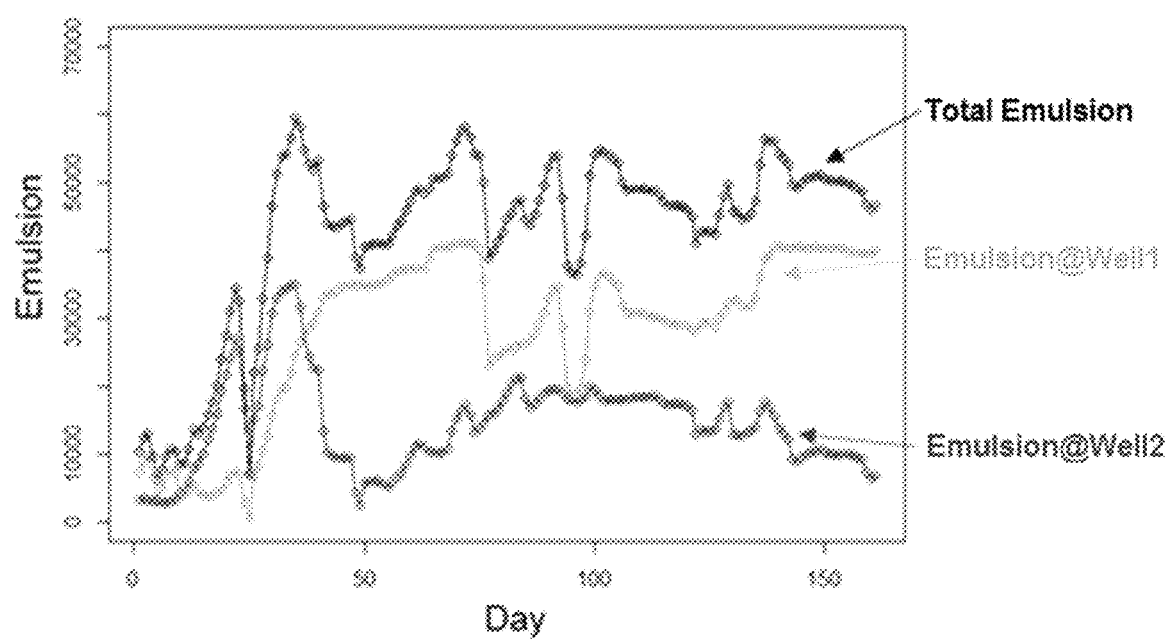
FIG. 3 shows an example of daily individual emulsions observed from two wells along with the corresponding total emulsion.

FIG. 3 shows an example of daily individual emulsions observed from two wells along with the corresponding total emulsion. More particularly, FIG. 3 shows emulsions observed at two individual wells along with corresponding total emulsion across 160 days.

Figure 4:
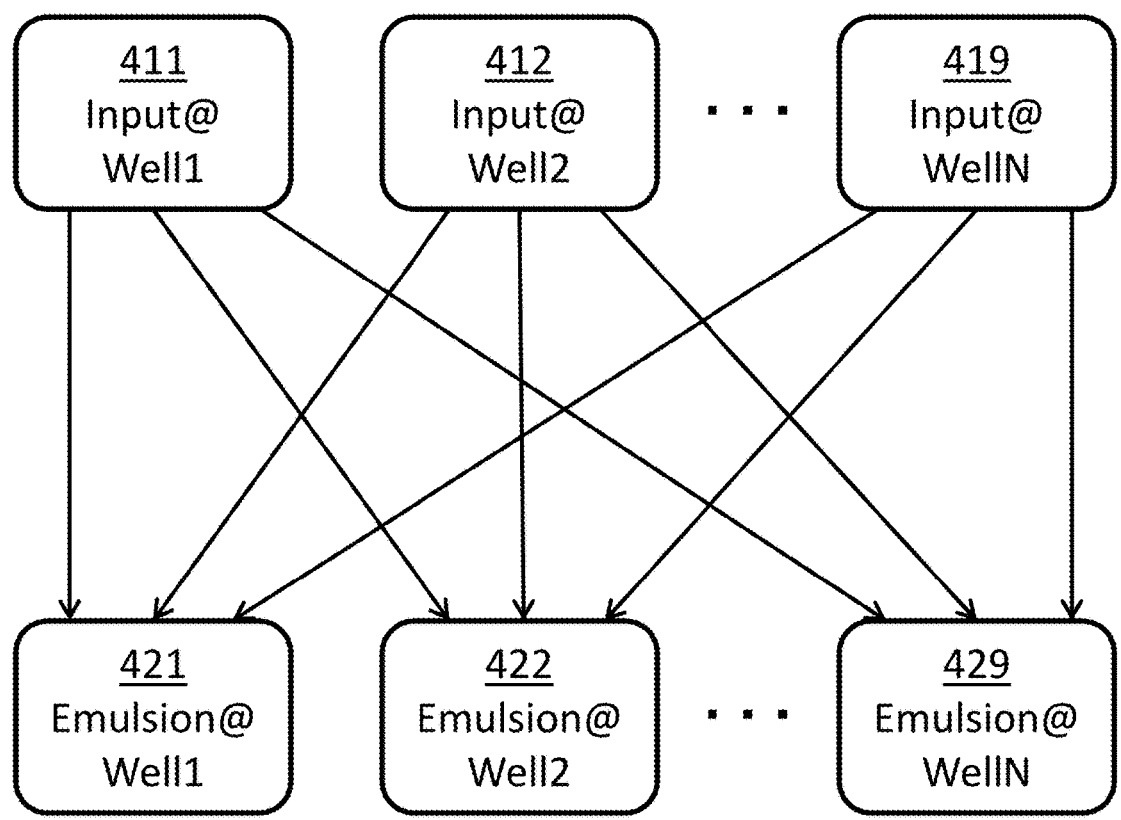
FIG. 4 shows an exemplary second modeling framework according to an illustrative embodiment of the present invention.

FIG. 4 shows an exemplary second modeling framework 400 according to an illustrative embodiment of the present invention. The second modeling framework 400 models the individual emulsions of each well as multiple output variables (e.g., 421, 422 and/or 429) allowing for cross-correlations. More particularly, the second modeling framework 400 depicts several models of each well's output emulsion (e.g., 429) with respect to its own input variables (e.g., 419) and also with respect to the input variables of the other wells (e.g., 411 and 412).

The second modeling framework 400 may employ simultaneous equation modeling (SEM), which involves designing a model for each well allowing for interactions with other well's variables. This model could be, for example, a linear equation system:

$$\text{Emulsion}_1 = \text{Input}_1 \beta_{11} + \text{Input}_2 \beta_{12} + \ldots + \text{Input}_n \beta_{1n} + \varepsilon_1$$

$$\text{Emulsion}_2 = \text{Input}_1 \beta_{21} + \text{Input}_2 \beta_{22} + \ldots + \text{Input}_n \beta_{2n} + \varepsilon_2$$

$$\text{Emulsion}_n = \text{Input}_1 \beta_{n1} + \text{Input}_2 \beta_{n2} + \ldots + \text{Input}_n \beta_{nn} + \varepsilon_n$$

The above model facilitates assessment of cross-correlations across wells. $\text{Emulsion}_i$ refers to the emulsion from well i. $\text{Input}_i$ refers to the set of input variables from well i. The input variable sets from each well may include control variables (e.g. at least one of heel steam flow, toe steam flow, gas casing pressure, emulsion pressure), observables (e.g. bottom hole pressure, blanket gas pressure, producer temperature profile, sub-cool profile, heel surface pressure, and toe surface pressure), and/or static variables (e.g. well position and/or depth). The parameter $\beta_{ij}$ denotes the effect of the input variables from well j on the Emulsion at well i (i=1, . . . , n and j=1, . . . , n).

The variables $\varepsilon_1, \ldots, \varepsilon_n$ are assumed to be random errors (e.g. Gaussian), and the covariance of these variables may be modeled using various techniques. For example, one may assume that there exist cross-correlations across wells meaning that the inter-well covariance $\text{Cov}(\varepsilon_i, \varepsilon_j)$ is assumed non-zero. Since $\text{Emulsion}_i$ is measured continually in time, the error vector $\varepsilon_i$, for each well i, denotes a time-series of errors observed serially (e.g. across days). Therefore, further correlation structure may be imposed on the errors in the temporal domain within each well. For example, errors observed within the same well i: $\text{Cov}(\varepsilon_{ij}, \varepsilon_{ik})$ may also be modeled as non-zero (e.g. we may assume an AR(1) structure on the within-well correlation structure).

Figure 5:
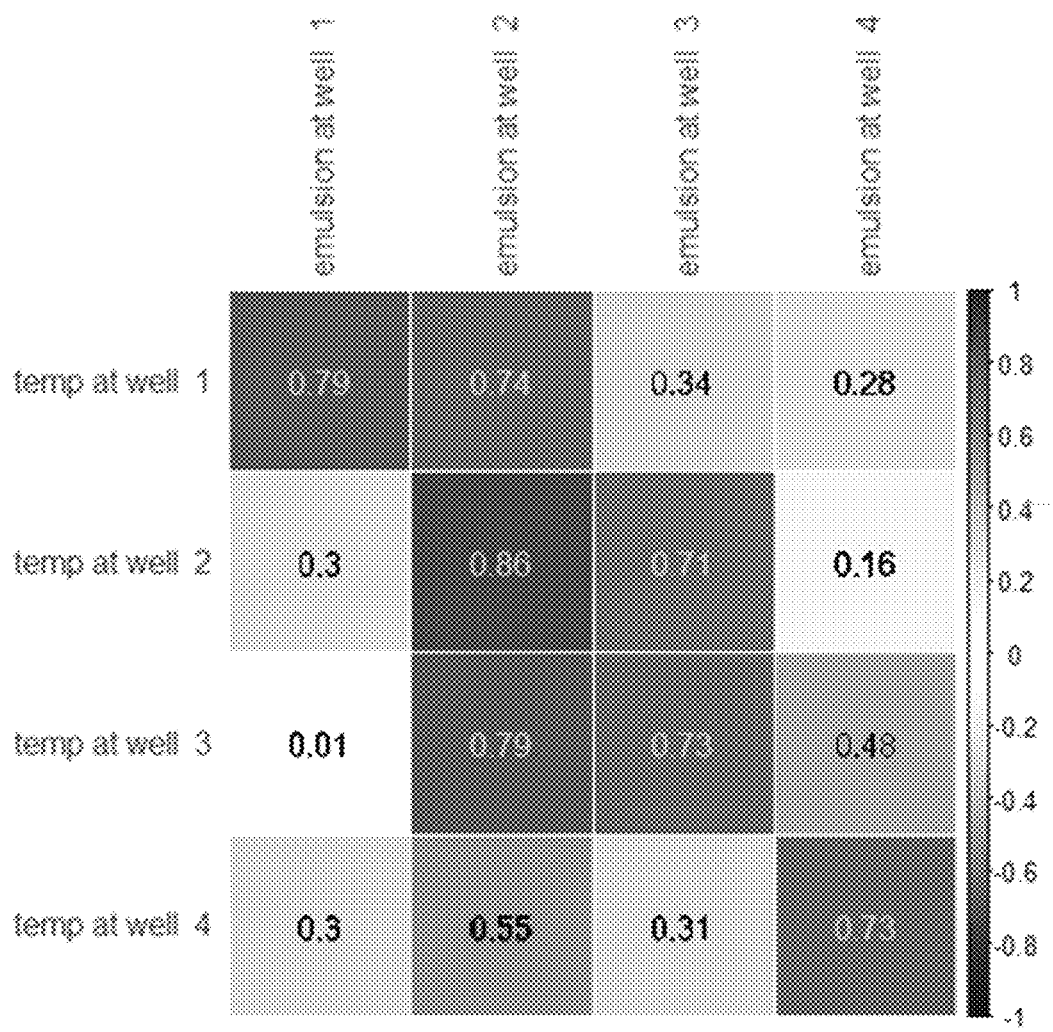
FIG. 5 is a correlation-matrix showing cross-correlations between temperatures and emulsions observed at four distinct wells on the same pad.

FIG. 5 shows how cross-correlations may be graphically visualized and assessed through a correlation-matrix. More particularly, FIG. 5 shows cross-correlations between average daily temperatures and daily emulsions observed at four distinct wells on the same pad. More specifically, the value in cell (i,j) denotes the correlation between "daily temperature at well i" and "daily emulsion at well j". As an example in FIG. 5 we see that the correlation between "daily temperature at well 3" and "daily emulsion at well 2" is equal to r=0.79. Note that the diagonal usually has the highest values due to the fact that the emulsion of the well is most highly correlated with the temperatures observed in the same well. However, the visualization also identifies cross-correlations, for example, between wells 2 and 3. The temperature at well 2 is highly correlated with the emulsion at well 3 (and vice versa). In fact, the temperature at well 3 is more highly correlated with the emulsion at well 2 than with the emulsion at well 3.

Figure 6:
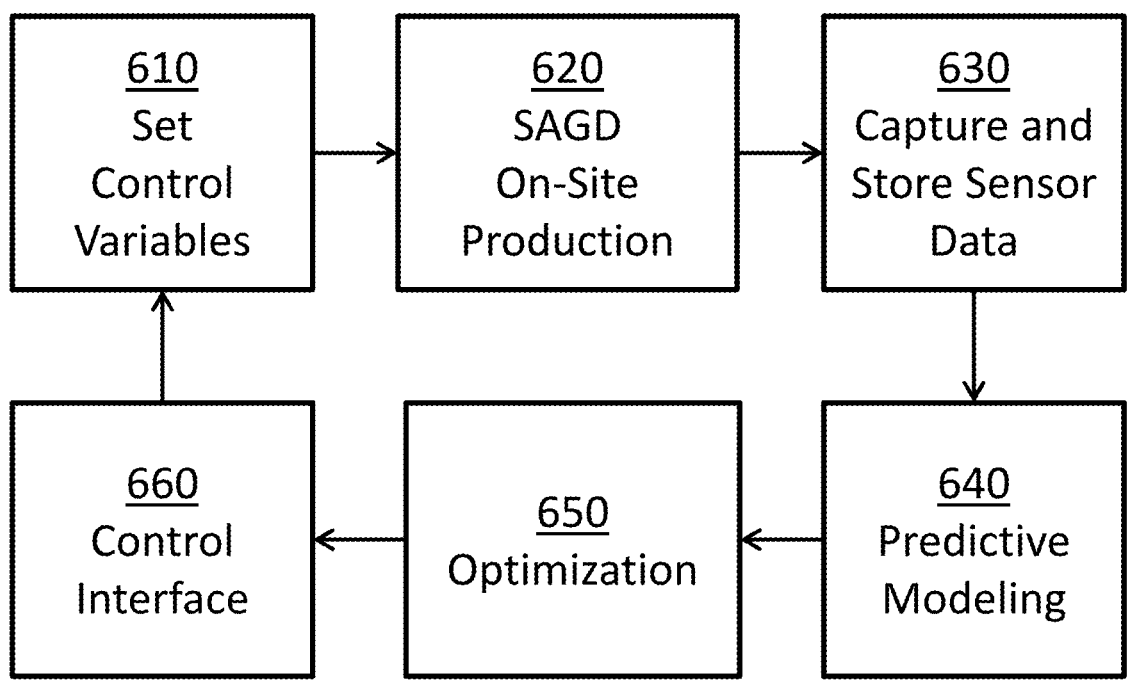
FIG. 6 shows a combined block and flow diagram for an exemplary system according to an illustrative embodiment of the present invention.

FIG. 6 shows a combined block and flow diagram for an exemplary system according to an illustrative embodiment of the present invention. One skilled in the art will understand that a system module may correspond to one or more method steps, and that a method step may correspond to one or more system modules. Thus, a given element shown in FIG. 6 may correspond to a method step or a system module.

In step 610, control variables for the SAGD well are set. These control variables may include parameters associated with steam injection (e.g., by injector pipe 121 in FIG. 1), such as toe steam flow, heel steam flow, steam pressure, and/or steam injection temperature. Additionally or alternatively, these control variables may include gas casing pressure, emulsion pressure.

Step 620 involves on-site production by the SAGD well using the configuration of control variables which were set in step 610. Production continues until another action is taken, such as repeating step 610 to change one or more control variables. As previously discussed, SAGD well production involves a horizontal pipe injecting steam which circulates in an oil sands layer to make oil move towards a horizontal producer pipe.

In step 630, sensor data is captured and stored in a historical database in real time. The sensor data may include control variables, observable variables, and/or output variables. The control variables may include parameters associated with steam injection (e.g., by injector pipe 121 in FIG. 1), such as toe steam flow, heel steam flow, steam pressure, and/or steam injection temperature. Additionally or alternatively, these control variables may include gas casing pressure, emulsion pressure, and/or emulsion temperature.

The observable variables may include, for example, downhole temperature, temperatures along producer and/or injector pipes, stream injection surface pressure, and/or blanket gas pressure. The output variables may include, for example, emulsion rate and/or oil flow. Additionally or alternatively, the output variables may include bottom hole pressure, blanket gas pressure, producer temperature profile, sub-cool profile, heel surface pressure, and/or toe surface pressure.

Step 640 involves predictive modeling using historical data for training. An analytical well model is provided with the aforementioned control variables (e.g., parameters associated with steam injection) as input. The analytical well model simulates sensors producing predicted observable variables, e.g., predicted temperatures and/or pressures, such as downhole temperature, temperatures along producer and/ or injector pipes, stream injection surface pressure, and/or blanket gas pressure. The analytical well model also produces predicted output variables, e.g., predicted oil flow and/or emulsion rate. Historical data is then used to assess accuracy of the predictions (e.g., of observable and output variables) and, if necessary, to make corrections to the analytical well model to improve the accuracy of future predictions.

Step 650 involves optimization which uses a predictive model (e.g., the analytical well model from step 640) to find an optimal configuration. The optimal configuration may be a set of control variables which maximizes one or more output variables (e.g., oil flow and/or emulsion rate) while satisfying constraints on one or more observable variables (e.g., maximum and/or minimum limits for temperatures and/or pressures). Thus, finding the optimal configuration may involve iteratively proposing changes to control variables (e.g., decreasing steam flow, increasing gas pressure, and maintaining the same emulsion pressure); inputting the changed control variables into the analytical well model to predict output variables; ensuring that the observable variables honor constraints; and comparing the predicted output variables to output variables for other configurations. In some embodiments, this comparison only considers configurations in which the constraints on observable variables are satisfied.

Step 660 involves a control interface, which may be a graphical user interface (GUI). Step 660 includes visualizing the model and considering the recommended optimal configuration. Step 660 also includes evaluating model performance. In one or more embodiments, the visualized model and recommended optimal configuration may be presented (e.g., displayed) to a user, who then performs the consideration of the optimal configuration and/or the evaluation of the model performance. The method then returns to step 610.

Figure 7:
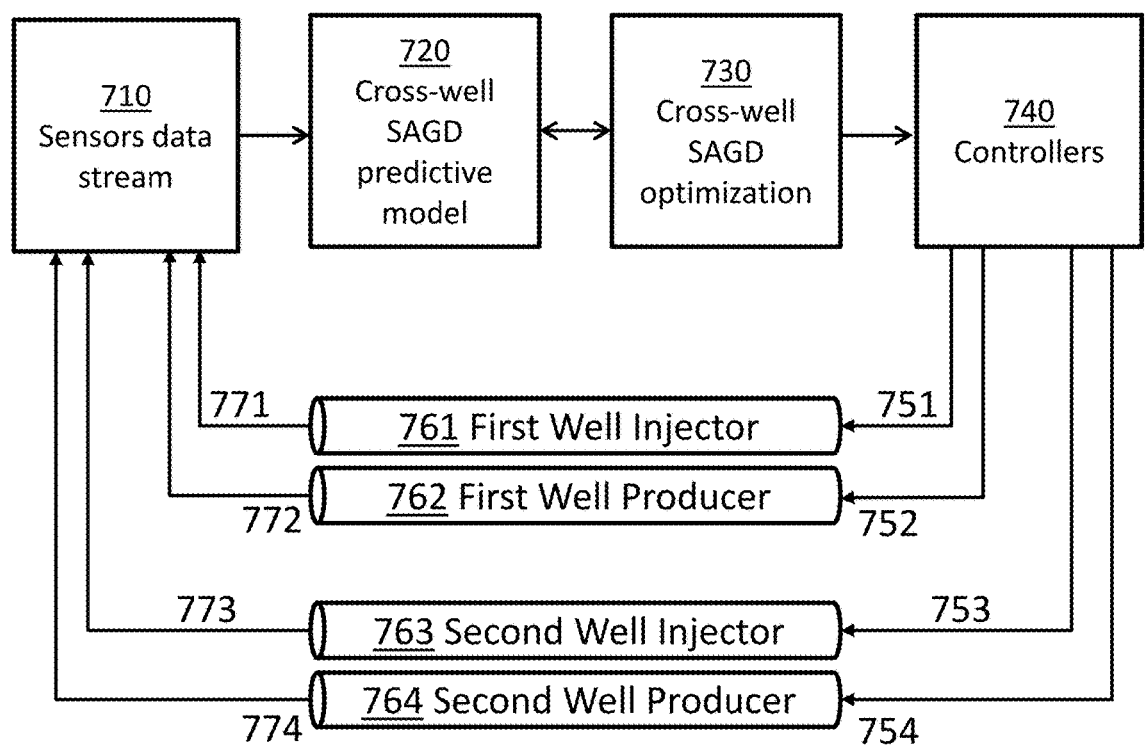
FIG. 7 shows a combined block and flow diagram for another exemplary system according to an illustrative embodiment of the present invention.

FIG. 7 shows a combined block and flow diagram for another exemplary system according to an illustrative embodiment of the present invention. FIG. 7 shows an exemplary system coupled to two wells: a first well comprising injector 761 and producer 762, and a second well comprising injector 763 and producer 764. However, techniques of the present invention are applicable to systems with any number of wells.

Moreover, one skilled in the art will understand that a system module may correspond to one or more method steps, and that a method step may correspond to correspond to one or more system modules. Thus, a given one of elements 710-740 shown in FIG. 7 may correspond to a method step or a system module.

Step 710 is similar to step 630 discussed above with reference to FIG. 6, but sensor data is received from multiple wells. The streamed sensor data is captured and stored in a historical database in real time. As discussed above with reference to FIG. 6, the sensor data may include control variables, observable variables, and/or output variables. In an illustrative embodiment, the sensor data stream (e.g., 771 and/or 773) for an injector pipe (e.g., 761 and/or 763) includes pressure, while the sensor data stream (e.g., 772 and/or 774) for a producer pipe (e.g., 762 and/or 764) includes temperature.

Step 720 involves predictive modeling using historical data for training. An analytical well model is provided with the aforementioned control variables (e.g., parameters associated with steam injection) as input. The analytical well model simulates sensors producing predicted observable variables, e.g., predicted temperatures and/or pressures, such as downhole temperature, temperatures along producer and/or injector pipes, stream injection surface pressure, and/or blanket gas pressure. The analytical well model also produces predicted output variables, e.g., predicted oil flow and/or emulsion rate. Historical data is then used to assess accuracy of the predictions (e.g., of observable and output variables) and, if necessary, to make corrections to the analytical well model to improve the accuracy of future predictions. Step 720 is similar to step 640 discussed above with reference to FIG. 6, but the modeling frameworks discussed above with reference to FIGS. 2 and 4 are utilized to account for cross-correlations.

Step 730 involves optimization which uses a predictive model (e.g., the analytical well model from step 720) to find an optimal configuration. The predictive model may be a set of control variables which maximizes one or more output variables (e.g., oil flow and/or emulsion rate) while satisfying constraints on one or more observable variables (e.g., maximum and/or minimum limits for temperatures and/or pressures). Step 730 is similar to step 650 discussed above with reference to FIG. 6, but control variables for multiple wells are considered.

Step 740 involves controllers transmitting control inputs 751-754 to wells 761-764 to adjust the control variables in accordance with the optimal configuration. Step 740 is similar to step 610 discussed above with reference to FIG. 6, but control inputs are transmitted to multiple wells. In an illustrative embodiment, the control inputs (e.g., 751 and/or 753) for an injector pipe (e.g., 761 and/or 763) includes steam rate, while the control inputs (e.g., 752 and/or 754) for a producer pipe (e.g., 762 and/or 764) includes pressure.

Wells 761-764 are similar to step 620 discussed above with reference to FIG. 6. Moreover, each well is similar to well 100 discussed above with reference to FIG. 1. The wells 761-764 transmit sensor data, which returns to step 710.

One or more embodiments of the invention, or elements thereof, can be implemented, at least in part, in the form of an apparatus including a memory and at least one processor that is coupled to the memory and operative to perform exemplary method steps.

Figure 8:
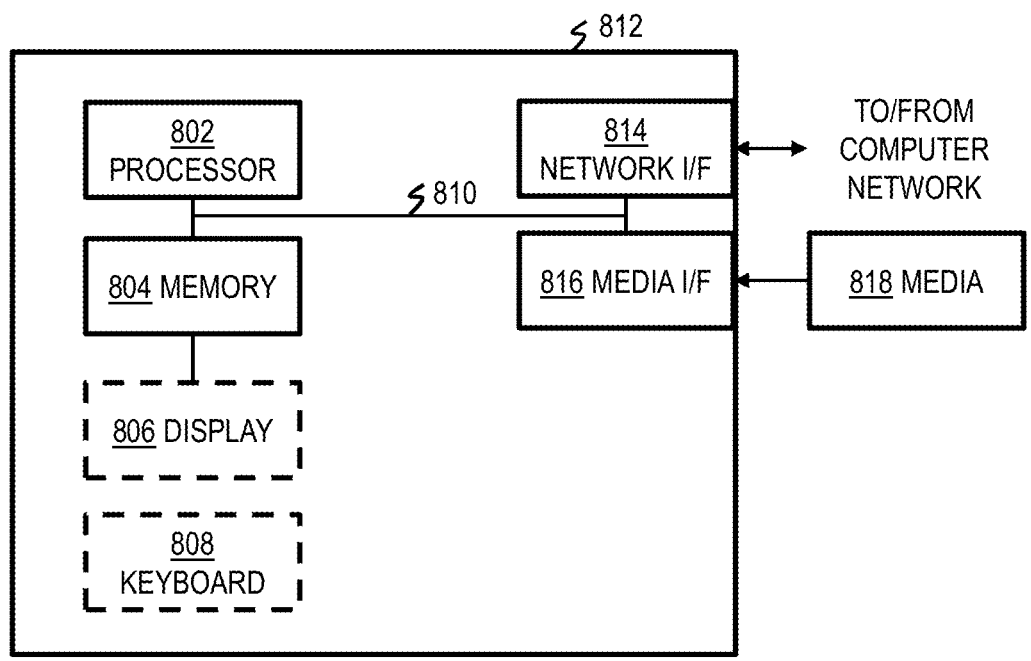
FIG. 8 depicts a computer system that may be useful in implementing one or more aspects and/or elements of the invention.

One or more embodiments can make use of software running on a general purpose computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams or other figures and/or described herein. The method steps can then be carried out using the distinct software modules and/or sub-modules of the system, as described above, executing on one or more hardware processors 802. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for use with a plurality of steam assisted gravity drainage wells, each well comprising one or more injector pipes and one or more producer pipes, the method comprising:
designing a first modeling framework which provides a model of total output for producer pipes of the plurality of wells from one or more input variables for respective injector pipes of the plurality of wells;
designing a second modeling framework which provides a model of output for at least one producer pipe of a given one of the plurality of wells based at least in part on:
one or more input variables for at least one injector pipe of the given one of the plurality of wells; and
one or more input variables for at least one injector pipe of at least another one of the plurality of wells;
utilizing the first and second modeling frameworks to determine an optimal configuration for the wells; and
configuring the given one of the plurality of wells to operate with the determined optimal configuration.

2. The method of claim 1, wherein the one or more input variables comprise one or more control variables.

3. The method of claim 1, wherein designing the second modeling framework comprises using simultaneous equation modeling.

4. The method of claim 1, wherein the second modeling framework facilitates assessment of one or more cross-correlations across the plurality of wells.

5. The method of claim 1, wherein designing the second modeling framework comprises designing a linear equation system to facilitate assessment of cross-correlations across the wells.

6. The method of claim 1, further comprising predictive modeling using historical data for training of at least one of the first and second modeling frameworks.

7. The method of claim 1, wherein utilizing the first and second modeling frameworks to determine an optimal configuration for the wells comprises:
proposing changes to the one or more values for the one or more input variables;
inputting the changed one or more values for the one or more input variables into the first and second modeling frameworks to predict one or more values for the one or more output variables; and
comparing the predicted values for the one or more output variables to values for the one or more output variables associated with other values for the one or more input variables.

8. The method of claim 1, wherein:
the output comprises at least one of an oil flow and an emulsion; and
the one or more input variables comprise at least one of: toe steam flow, heel steam flow, gas casing pressure, emulsion pressure, steam pressure, steam injection temperature, and emulsion temperature.

9. An apparatus for use with a plurality of steam assisted gravity drainage wells, each well comprising one or more injector pipes and one or more producer pipes, the apparatus comprising:

a memory; and at least one processor, coupled to said memory, and operative to:
- design a first modeling framework which provides a model of total output for producer pipes of the plurality of wells from one or more input variables for respective injector pipes of the plurality of wells;
- design a second modeling framework which provides a model of output for at least one producer pipe of a given one of the plurality of wells based at least in part on:
  - one or more input variables for at least one injector pipe of the given one of the plurality of wells; and
  - one or more input variables for at least one injector pipe of at least another one of the plurality of wells;
- utilize the first and second modeling frameworks to determine an optimal configuration for the wells; and
- configure the given one of the plurality of wells to operate with the determined optimal configuration.

10. The apparatus of claim 9, wherein the one or more input variables comprise one or more control variables.

11. The apparatus of claim 9, wherein designing the second modeling framework comprises using simultaneous equation modeling.

12. The apparatus of claim 9, wherein the second modeling framework facilitates assessment of one or more cross-correlations across the plurality of wells.

13. The apparatus of claim 9, wherein designing the second modeling framework comprises designing a linear equation system to facilitate assessment of cross-correlations across the wells.

14. The apparatus of claim 9, further comprising predictive modeling using historical data for training of at least one of the first and second modeling frameworks.

15. A non-transitory computer readable medium comprising computer executable instructions which when executed by a computer cause the computer to perform a method for use with a plurality of steam assisted gravity drainage wells, each well comprising one or more injector pipes and one or more producer pipes, the method comprising:
- designing a first modeling framework which provides a model of total output for producer pipes of the plurality of steam assisted gravity drainage wells from one or more input variables for respective injector pipes of the plurality of wells;
- designing a second modeling framework which provides a model of output for at least one producer pipe of a given one of the plurality of wells based at least in part on:
  - one or more input variables for at least one injector pipe of the given one of the plurality of wells; and
  - one or more input variables for at least one injector pipe of at least another one of the plurality of wells;
- utilizing the first and second modeling frameworks to determine an optimal configuration for the wells; and
- configuring the given one of the plurality of wells to operate with the determined optimal configuration.

16. The non-transitory computer readable medium of claim 15, wherein the one or more input variables comprise one or more control variables.

17. The non-transitory computer readable medium of claim 15, wherein designing the second modeling framework comprises using simultaneous equation modeling.

18. The non-transitory computer readable medium of claim 15, wherein the second modeling framework facilitates assessment of one or more cross-correlations across the plurality of wells.

19. The non-transitory computer readable medium of claim 15, wherein designing the second modeling framework comprises designing a linear equation system to facilitate assessment of cross-correlations across the wells.

20. The non-transitory computer readable medium of claim 15, further comprising predictive modeling using historical data for training of at least one of the first and second modeling frameworks.

* * * * *